United States Patent [19]

Gharachorloo

[11] Patent Number: 4,658,247

[45] Date of Patent: Apr. 14, 1987

[54] PIPELINED, LINE BUFFERED REAL-TIME COLOR GRAPHICS DISPLAY SYSTEM

[75] Inventor: Nader Gharachorloo, Ithaca, N.Y.

[73] Assignee: Cornell Research Foundation, Inc., Ithaca, N.Y.

[21] Appl. No.: 635,806

[22] Filed: Jul. 30, 1984

[51] Int. Cl.[4] .............................................. G09G 1/14
[52] U.S. Cl. .................................. 340/747; 340/703; 340/750; 364/521
[58] Field of Search ............... 340/701, 703, 744, 747, 340/750; 364/131, 133, 136, 518, 520, 521, 522

[56] References Cited

U.S. PATENT DOCUMENTS

| | | | |
|---|---|---|---|
| 3,473,160 | 10/1969 | Wahlstrom | 340/750 |
| 4,197,590 | 4/1980 | Sukonick | |
| 4,353,061 | 10/1982 | Beck | 340/744 |
| 4,496,944 | 1/1985 | Collmeyer et al. | 340/747 |

OTHER PUBLICATIONS

Bechtolsheim, A. & Baskett, F., "High Performance Rastor Graphics for Microcomputer Systems" ACM 0-89791-021-4/80/0700-043.
Clark, J. & Hannah, M. "Distributed Processing in a High-Performance Smart Image Memory System" *Lambda* Fourth Quarter 1980, p. 40.
Cosman, M. & Schumacker, R. "System Strategies to Optimize CIG Image Content" *Proceedings of the Image II Conference*, Scottsdale, Ariz., 10 Jun. 1981.
Demetrescu, S. "High Speed Rasterization Using a Highly Parallel Smart Bulk Memory" *Stanford U. Computer Systems Laboratory*, Tech Report #83-244, Jun. 1983.
Fuchs, H. & Poulton, J. "Pixel-Planes: A VLSI-Oriented Design for a Raster Graphics Engine" *VLSI Design* Third Quarter, 1981, p. 20.
Fuchs, H. & Poulton, J. et al. "Developing Pixel--Planes, a Smart Memory-Based Raster Graphics System" *Proceedings of the 1982 Conference on Advanced VLSI*, Massachusetts Institute of Technology.
Gupta, S., Sproull, R. & Sutherland, I., "A VLSI Architecture for Updating Raster-Scan Displays" *Computer Graphics*, Aug. 1981, p. 71.
Whelar, D. "A Rectangular Area Filling Display System Architecture" *Computer Graphics* Jul. 1982, p. 147.
Whitted, T. "Hardware Enhanced 3-D Raster Display System" *Proceedings: 7th Man-Computer Communications Conference* p. 349, National Research Council of Canada, 1981.

*Primary Examiner*—Gerald L. Brigance
*Assistant Examiner*—Jeffery A. Brier
*Attorney, Agent, or Firm*—Michael F. Brown

[57] ABSTRACT

A color graphics system for displaying a plurality of polygons, based upon polygon commands supplied by a host computer. The system accepts the commands from the host and circulates them in a circular queue past a polygon processor or "painter's station" which examines each to see if it is on the line currently being processed. If the polygon is on the line, a line command or "micropainter" is generated and placed in a pipeline comprising a plurality of microprocessors, one for each picture element ("pixel") in the video scan line. The micropainters are passed from processor to processor down the pipeline, in synchronization with the video scan. Each pixel processor examines the micropainter and stores its color if the painter affects the pixel on the scan line which is assigned to that processor, and, in one embodiment, if the micropainter is painting a polygon which is higher (less in depth) than the last polygon whose color was stored in the processor. A special command, called a "microinspector" is introduced into the pipeline once each scan, and causes each pixel processor in turn to output its stored video information to a video refresh processor, which drives the display.

14 Claims, 12 Drawing Figures

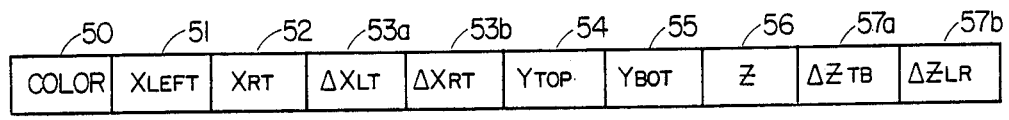
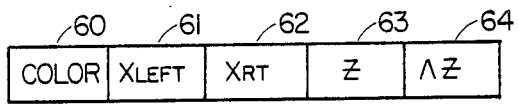
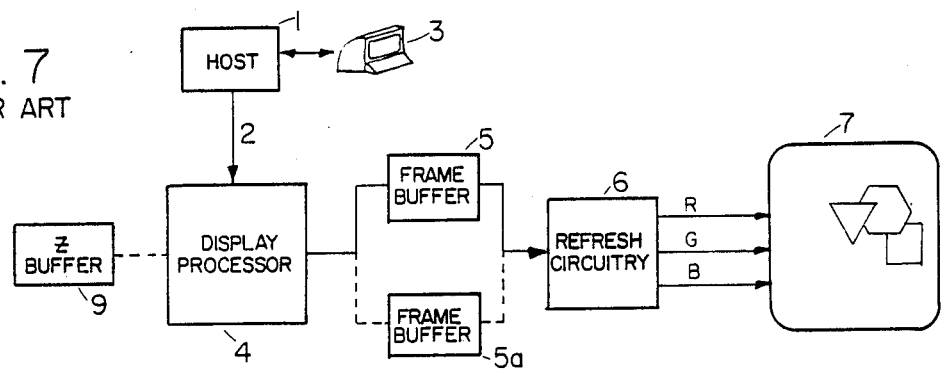
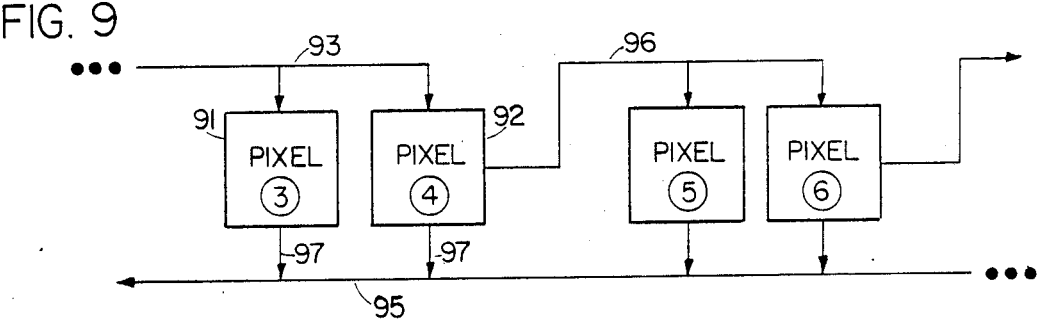
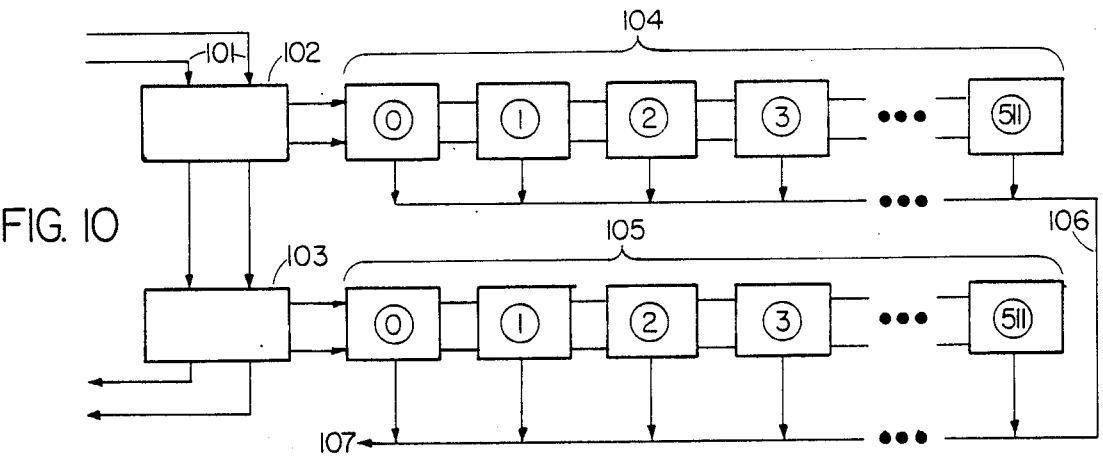

PIPELINED, LINE BUFFERED REAL-TIME COLOR GRAPHICS DISPLAY SYSTEM

BACKGROUND OF THE INVENTION

1. Field of the Invention

The invention pertains to methods and apparatus for generation of color video images from computers. More specifically, the invention pertains to methods and apparatus for generation of real-time raster-scanned color graphics from computer-generated instructions comprising multiple polygons making up a video image.

2. Description of the Prior Art

The idea of storing an image in computer memory and repeatedly "refreshing" (updating) the raster display by scanning the stored image was originally introduced by Noll in 1971. Since then stored image or "frame buffer" (computer memory storing an entire video screen image) systems attached to television-like raster color displays have dominated the field of computer graphics. Such graphics are used in such applications as video games, computer added design, and computer simulation for pilot training and the like.

An image may be composed of a plurality of polygons. In many applications of computer graphics, such as real-time simulation applications, a large number of polygons is needed to represent a realistic image. An application program running on the main, or "host" computer will compute the location, shape, and color of each polygon in the image. Each polygon is composed of several "pixels" (picture elements—the smallest addressable image unit of the screen-one dot). Display procedures running on the display processor will "paint" (fill with color) all pixels within a given polygon into the frame buffer. On a typical 512×512 (512 lines by 512 pixels) frame buffer, "background painting" (filling the entire screen with a single color) requires 262,144 pixel store operations into the frame buffer plus a similar number of overhead looping operations. Therefore, it is well-known in the art to use a special purpose display processor to unload the large number of simple "pixel operations" (storing a color into a storage location representing a picture element) from the general purpose host computer.

A typical prior art display processor (4) with frame buffer memory (5) & (5a) is shown in FIG. 7. The host (1) is connected to the display processor through I/O processors (2). In a programming environment communication between the host (1) and the terminal (3) is performed by a sequence of characters. Similarly, in a graphics environment communication between the host (1) and the display processor (4) is performed by a sequence of polygon commands. Each polygon command can be interpreted by the image processor (4) to call one of the display porcedures with the proper parameters such as color and size. Note that points, lines, triangles, rectangles and trapezoids can be painted using polygon commands.

While the image processor (4) is painting polygons into the frame buffer (5), the refresh circuitry (16) is periodically refreshing the raster display (7) by scanning across each row of the frame buffer (5) and reading the color stored at each pixel location. Periodic display refreshing at 30 frames per second (a minimum for "real time" image generation without flicker) requires a constant 512×512×30=7,864,320 frame buffer read operations per second. Additional frame buffer bandwidth is required for image generation or painting. Since the frame buffer (5) may be simultaneously requested by the image processor (4) and the refresh circuitry (6), shared memory access contentions should be resolved by synchronization of the two processes or by giving the refresh circuitry top priority. Some systems add a second frame buffer (5a), identical with the first, to allow video refresh from one buffer while the image processor is updating the other. Additionally, a "Z-Buffer" (9), giving the depth of any point in the frame buffer, may be provided for hidden-surface removal.

The programmer looks at the display processor system as a special purpose peripheral. As described above, the functional behavior of the frame buffer can be easily understood. The programmer is expected to build and maintain several polygon lists for a specific application. An interactive program will then respond to user inputs by updating polygon lists and sending parts of each polygon list to the display processor. The polygons will then appear on the screen after a finite image updating delay.

All display processors support a set of polygon painting commands, just as microcomputers support a set of basic instructions. Therefore the main performance index for differentiating among various classes of display processors is the typical image updating delay, which is the time from sending of polygons to the display processor to the time that the polygons are fully displayed on the screen. For typical images the image updating delay may range from a few minutes to several seconds depending on the system hardware. An image stored in the frame buffer (5) will be displayed for several refresh periods. After observing the image for some time, the user may request that portions of the present image be updated or a new image be generated.

Contrary to common belief, frame buffer memory design is not an easy problem which can be cured in time by increase in capacity and decrease in cost of standard MOS memories. The frame buffer memory in present commercial systems may be as complex as a 512×512 orthogonally structured skew interleaved boundary aligned time multiplexed shared static random access memory with effective memory bandwidth in excess of 8 MHz. Image regeneration of such systems may last for several seconds. Many dynamic or real time applications cannot tolerate such long delays. Several special purpose architectures have been developed to speed up the image generation process.

There is a present need for real time color image generations. Viewing operations, such as coordinate translation and rotation, are fundamental to interactive computer graphics. In the specific case of designing VLSI circuits, the image of the circuit on the screen is a small window for viewing part of a much larger layout of several thousand transistors and other electrical devices. The designer may want to scroll in various directions with the same viewing window in order to follow connections to other parts of the circuit. Other common editing operations such as deleting a piece of the layout, dragging an object across the screen and making incremental changes to the image generally require image regeneration and may last for several seconds. Given that the designer has to deal with several thousand transistors, such unnecessary delays can become frustrating. Real time systems can perform such operations immediately and without any delay. Video games also require immediate response to the user inputs. Frame buffer systems are generally too slow and expensive for such dynamic and popular applications. More advanced systems for flight simulation require real time image generation for causing an illusion of motion in real life environments. Although vector systems (using a special display drawing point-to-point lines to create images, in place of the TV-like raster) can perform dynamic operations by regenerating the vector image at 30 frames/sec, it is highly desirable to achieve similar performance on raster color systems. The general cure to all of the above (and even more) problems is regeneration of raster color image at 30 frames/sec. Therefore, it is an object of the invention to provide special purpose hardware that can generate real time (30 frames per second or better) color images.

For a prior art enhanced frame-buffer system, see Sukonick, et al., U.S. Pat. No. 4,197,590 (1980).

Several image synthesis and analysis problems can be solved by performing simple computations at every pixel in the image. However, the large number of computations can cause long and intolerable delays. The computation time can be reduced by employing several processors to simultaneously operate on parts of the image. A possible solution is to have an array of simple processors with a processor for every pixel in the image. Like other architectures, a special purpose control processor will issue data and simple instructions to each row and column of the pixel processor array. Pixel Planes designed by Fuchs and Poulton ("Pixel-Planes: A VLSI-Oriented Design for a Raster Graphics Engine", *VLSI-Design*, third quarter 1981) is a member of the processor per pixel family. Whelan ("A Rectangular Area Filling Display System Architecture", *Computer Graphics*, July 1982) has also designed a rectangular area filling system which paints rectangles by selecting a range of rows and columns of the image. Each processor will then paint its pixel if both its row and column lines are selected. These architectures attempt to paint all pixels within a polygon or rectangle in one operation cycle.

In addition to simple pixel painting, hidden surface removal by depth and polygon color shading require computations at every pixel location. With processor per pixel architectures, one can perform such computationally intensive operations by increasing the complexity of each pixel processor without any sacrifice in overall system speed and performance.

Although the idea of having a processor per pixel is a desirable solution for the image generation problem, implementation of a 512×512 pixel processor array is simply too large to be practical. Those familiar with parallel processing are aware of several classical designs which have failed mainly due to underestimation of overall system size and cost.

It is therefore an object of the invention to provide a real-time color graphics display processing system without the requirement for complex one-processor-per-pixel systems.

Multiprocessor schemes attempt to achieve speed by painting several pixels from a given polygon in each operation cycle. The goal is minimization of the time required for painting each individual polygon.

Since a frame is composed of several polygons, one should ultimately attempt to achieve real time performance by painting several pixels from several polygons in each operation cycle. The goal is reduction of the time required for painting each frame to less than 33 milliseconds. One may then exploit the larger parallelism in this problem to systematically build an array of processors which can generate real time images.

SUMMARY OF THE INVENTION

The invention presents a real-time color graphics display processing system using multiple processors to provide a line buffer having one processor for each pixel in the line (typically 512 or 1024). Instructions for each polygon in the screen image are circulated in a "Ring" structure so long as they are "active" (i.e. will paint at least one pixel on the current, or a later, line). Polygon commands are added by a host computer, and circulate until removed from the Ring. Each polygon command which will affect the current line generates a "micropainter" instruction when it reaches the "Painter's Station". The micropainter is loaded into the beginning of the line buffer pipeline connecting the pixel processors. The line buffer pipeline advances at such a rate that it is exactly synchronized with the refresh rate of the screen—one screen line equalling the time for one painter to fully traverse the pipeline. As the micropainter is passed from processor to processor, each processor examines it to decide if the command affects its pixel. If so, the processor copies the painter color. Micropainters are added to the line buffer pipeline (null painters being added to exactly fill the pipeline after all polygon commands have been processed) until it is full (one line's worth of pixels), at which point a "microinspector" command is entered into the line buffer pipeline, followed by the micropainters for the next line. When the microinspector reaches a processor, it causes the processor to dump its contents to the video output. Since the pipeline is synchronized to the line refresh rate, one passage of the microinspector generates one video line, in synch to the display. The preferred embodiment of the invention allows for a maximum number of active polygons equal to the number of pixels on a line (512 or 1024) at any given time. This allows for a more than ample number of total polygons in an image for real-time generation of complex color images.

DESCRIPTION OF THE DRAWING

FIG. 5 shows a possible format for polygon commands.

FIG. 6 shows a possible format for a micropainter.

FIG. 7 shows a block diagram of a prior art system.

FIG. 9 shows a line buffer with parallel odd/even pixel processors.

FIG. 10 shows an embodiment of the invention with more than one line buffer.

DESCRIPTION OF THE PREFERRED EMBODIMENT

To help understand the operation of the invention, a simple analogy will be helpful. Imagine a city having 512 streets, each street with 512 houses, and also having a ring road similar to the "Beltway" surrounding the town. To aid the fire department each house is to have a sign on the curb which must be painted a specific color according to certain criteria. For example, houses with young children get a red sign, wheelchair occupants blue, yellow if an occupant is deaf, green if there are pets, etc. Each sign can be only one color, and must be painted according to a hierarchy of colors. The city is strictly zoned, so each sign color appears only with others of its kind in polygonal neighborhoods. The city wishes to paint all the signs in one day, and will make up a map of sign colors as they are telephoned in to city hall in order.

The city rents a plurality of buses, one for each polygonal neighborhood (like-colored group of signs), and fills them with painters. Each bus driver is given a list of streets (first and last streets) and houses on each street (beginning and ending house numbers) which are included in the neighborhood. The buses are sent out to circulate around the beltway. Each homeowner will stand by the curb and allow a painter to paint his sign only if the painter is painting a higher priority color than that which the sign is already painted (i.e. a yellow sign may be painted blue, but not green). If a building inspector appears, the homeowner is to run inside, telephone city hall and report his sign color.

The city fire commissioner starts at the end of First Street and stops each bus in turn. If the bus driver's list includes that street he discharges a painter, and the fire commissioner gives the painter a list telling him the range of house numbers whose signs are to be painted. The painters walk down the block in lockstep, each stopping at every house. After the last bus has been stopped, a building inspector is sent down the street following the last painter. The painters ask at each house if they should paint the sign. The homeowner answers "yes" if his house number is on the painter's list and if the painter has a higher-priority color than that already on the sign. The homeowner calls City Hall when the building inspector walks by, after the last painter. As soon as the inspector leaves down First Street, the fire commissioner moves to Second, stopping each bus again. The process repeats until he reaches 512th street, stops the last bus there, and sends an inspector after the last painter. Empty buses are directed off the Beltway after they discharge their last passenger. When the last building inspector reaches number 512 512th street, triggering a phone call from the homeowner, all signs have been painted and the map at city hall is complete.

Figure 2:
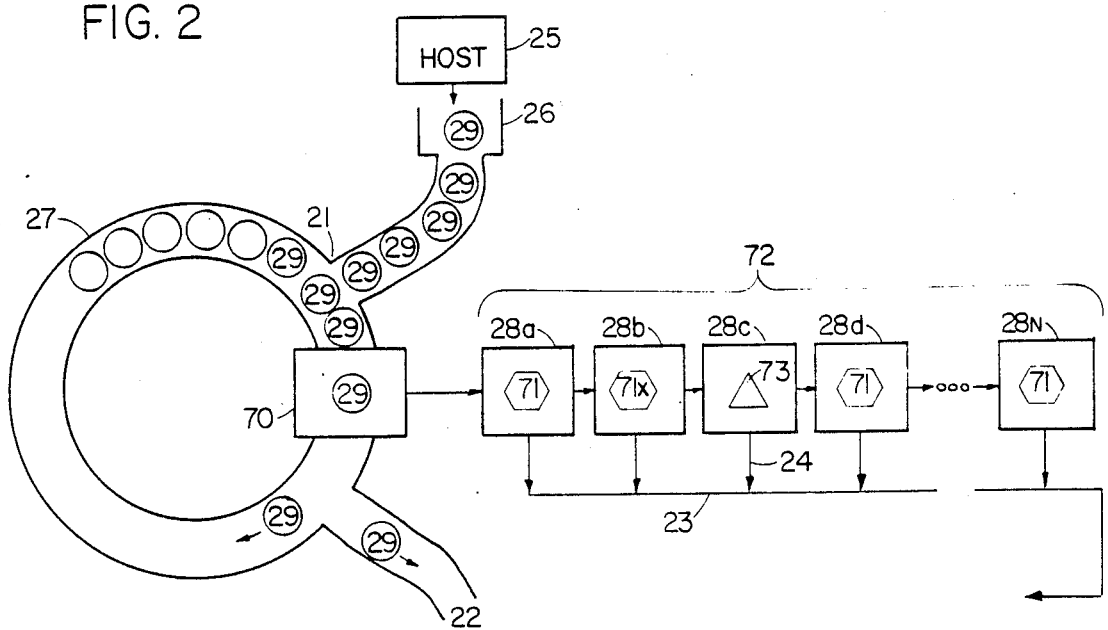
FIG. 2 shows a stylized diagram of the data flow in the invention.

In essence this is the method used by the invention to paint a video screen full of polygons. FIG. 2 shows a diagram of the data flow in the video system of the invention. The host computer (25) generates polygon commands ("buses") (circles (29)) which are placed in an input queue (26). The polygon commands (29) remain in the queue ("courthouse parking lot") until it is their turn to enter the active polygon ring ("Beltway") (27). FIG. 5 shows a possible format or a polygon command.

It should be noted at this point that one can decompose a polygon into several variable length horizontal lines. Each horizontal line represents those pixels on a single scan line on the screen upon which the polygon may be found or upon which it is "active". Thus, in order to describe a polygon for decomposition, one needs to specify at least the first and last scan lines upon which the polygon is located ("active"), and the range of pixels which are active on the first line. In FIG. 5 these are shown as left-most position on line (pixel) ("Xleft" (51)), the right-most pixel location ("Xright" (52)) and the change in Xleft and Xright for each line on the screen ("Delta Xleft" (53a) and "Delta Xright" (53b)). The range of active lines is given as "Ytop" (54) and "Ybottom" (55). A polygon command also contains a notation as to the color (50). Hidden surface removal, to be discussed below, requires some indication as to the depth or time in which the polygon is to be painted, which is shown as "Z" or "time" (56). If the polygon is not constant in the Z axis (i.e. slopes in depth) "Delta Z" (57a) (57b) factors may be added and computed by the host to indicate change in Z along the edge of the polygon, and slope along the X axis.

It should be understood that any format for polygon commands from which the line information can be determined would be appropriate within the teachings of the invention. The complexity of the polygon command (and thus of the processing at the painter's station) will depend on the complexity of the most-complex figure to be painted. If the polygons are limited to "Manhattan Rectangles" (rectangles aligned with the X-Y axes like blocks in New York City), then only, Xleft, Xright, Ytop and Ybottom need be specified. A system allowing random-shaped polygons would require a plurality of delta Xleft and Delta Xright pairs, with a break point ("Ymid") for each, to indicate when to pass on to the next pair. The polygon command shown here is given for the purpose of illustration only. Polygon commands are generated by an application program running on the host computer, which can use any method or combination of methods known to the art and which method forms no part of the invention. It is assumed that the host computer is capable of generating polygon commands as needed and placing them in the queue.

The polygon commands (29) are sorted by the host in order to first active line (Ytop (54)) and are entered into the ring (27) at a selector station (21) which allows a polygon command into the ring when appropriate. The polygon commands advance one at a time into the painter station (70) where they are examined to see if the polygon is active on the current line. This is equivalent to the building inspector stopping a bus and determining if there are any painters to get off. Using Ytop (54) and Ybottom (55), it may be quickly determined whether or not the polygon command is active on this line. If Ybottom is higher on the screen than the line currently being processed the polygon command is discarded (22) (the bus shunted off the Beltway). If the polygon is not yet active (Ytop is lower than the current line being processed) no line command (or an empty, or null line command) will be generated in this cycle. If the current line is between Ytop and Ybottom (the street is on that buses' route) the painter station ("building inspector") will generate an instruction we shall call a "micropainter" (the bus discharges a painter). The micropainters are preferably presented to the pipeline as a plurality of parallel signal lines, one line or group of lines for each element in the micropainter, plus one line for the refresh flag.

The micropainter (71) is placed into the first processor (28a) in the chain of processors (28) which make up a line buffer (72) ("the houses on the street"). Each cycle the painter station (70) accepts another polygon instruction (29) (stops another bus) and generates another micropainter (71) (sends a painter down the street). Each micropainter in a processor advances one processor further down the pipeline at each cycle (the painters pass down the street). If there is no micropainter to be generated in a given cycle (all of the buses dealing with this line have already discharged painters) the painter station creates a null micropainter (a painter with no active instructions) or repeats the last micropainter generated in order to keep the pipeline full. When a micropainter (for example (71x)) arrives at a station (28b) the processor at that station inspects the micropainter to determine if the color in the micropainter is to be copied into the pixel buffer at that processor location. FIG. 6 shows a possible format for micropainter instructions. The micropainter would have the left- and right-most positions which the painter is to paint—Xleft (61) and Xright (62), the color (60), and possibly a notation as to the depth (Z) (63) of the painting. If the pixel represented by the pixel processor (28b) falls between Xleft and Xright the color in the micropainter is copied into the pixel buffer. The depth may be used to assure that only micropainters which are to be painted higher in level are copied: that is to say, that no hidden surface instruction wuld be copied into the pixel. In the time-priority case, the priority is implicit in the order the micropainters are presented, and no comparison is necessary.

The cycles during which the micropainters are advanced into the pipeline and the polygon commands are advanced into the active polygon ring are synchronized such that when the pipeline is full (512 micropainters have been put into the pipeline, for example) exactly one scan line's time has past. At this point a microinspector instruction (73) of any convenient format is introduced into the pipeline, again at position (28a), the left-most pixel processor (the analog to sending the building inspector after the last painter). The pixel processor then writes its color (24) to the video bus (the homeowner calls city hall) (23), from which it is placed in the video output. In the next cycle the microinspector (73) advances to the next pixel and the next and so on (in the example shown in FIG. 2 the microinspector is in position (28c)). The micropainter (71x) at position (28b) would be the first micropainter for the following line. The pipeline, then, is always full. In this way the generation and refreshing of the image by the pipeline is synchronized with the raster beam of the video screen.

In many graphics systems it is important that one take into account a depth factor. That is, those polygons which hide other polygons should appear and those which are hidden (or parts of which are hidden) should not. This may be done in one of two ways. Either the polygon may be coded by the computer as to its actual depth (Z axis) (depth priority) or the computer may decide in which time order they are to be painted (time priority) (later paintings covering over earlier ones). In either case the polygon in the active polygon ring will be stamped with an indication of depth for the polygon which may be used by the line buffer processors in the depth priority case to determine whether or not any individual processor ought to copy the color of the micropainter into its buffer nor not. This eliminates the necessity for a separate Z buffer (9) which was used in the prior art and which added the additional complexity of use which was undesirable for maximum speed. Alternatively, the host computer may sort the polygon instructions in time priority order and the selection station (21) may insert them into the active polygon ring in order both by line and by time priority. In this way the polygons in the time priority list would be time stamped before being inserted in the rear of the Ybuckets. At the entrance of the painter station the time stamp on the next polygon command in the ring would be compared to the time stamp on the next command from the host. The command with the lower time stamp will be selected for entering the painter station while the other command waits its turn. Thus the increasing time stamp condition is satisfied inside the line buffer around the ring within each Ybucket. That way the painters entering the line buffer are automatically in time priority order and there is no comparison necessary. If a painter is active its color is copied into the buffer without any comparison necessary. In depth priority hidden surface removal, the horizontal line command can be modified to include information about the depth of the polygon along the line (slope). In other words, Z and delta Z factors can be added per line whereby the depth at any point along the line can be easily computed and compared to the highest depth encountered along the line in any given processor. Simmilarily, a delta color factor could be added to allow shading color along the line, without departing from the teachings of the invention.

In both time and depth priority painting of polygons, a first-in first-out (FIFO) polygon buffer for entering polygons (26) will simplify communication with the host (25). One may also combine the active polygon ring and the buffer into one memory module.

As indicated in the micropainter/line buffer situation the polygon commands need not actually circulate around the ring. One can generate memory addresses to give the affect of circulation without actually circulating all the commands. At most 512 polygons can be active in painting each line of the frame (or 1024 depending on the number of pixels). The small number of active polygons allows the use of one small and fast random access memory for implementing both the active polygon queue and input buffer.

Figure 11:
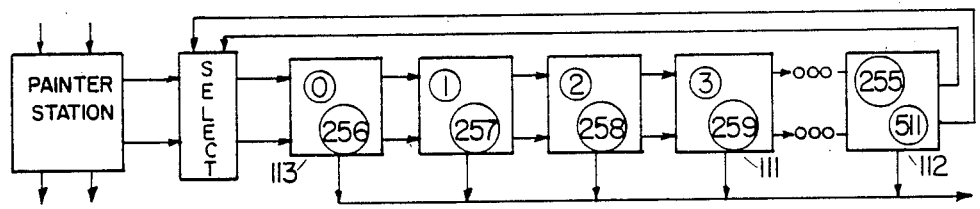
FIG. 11 shows an embodiment with less than one processor per pixel.

At every instance in time 512 (or 1024, or any other number of pixels per line) micropainters are working within the line buffer. It will be realized that within the teachings of the invention one may either have one processor per micropainter, with the pixel buffers being simply buffers, the intelligence in the painter (the painter decides whether or not to paint the sign in front of the house himself) or the painter can be an instruction passed from processor to processor with one processor at each pixel buffer (the houseowner tells the painter whether or not to paint the sign). It may also be desired, within the teachings of the invention, to provide fewer processors than pixels, (FIG. 11) for example only one-half as many, and then circulate the painters and inspector twice through the pipeline (this would allow only one-half as many active polygons per line, of course). Each processor will process data for two locations. For example, referring to processor (111), micropainters be inspected first for location 3. When the microinspector is passed through, the processor writes its data to the video bus (114) and switches to location 259. When processor (112) is processing pixel 255 painters, it copies each painter back to the input of processor (113), and the micropainter circulates back through the pipeline for a second pass.

The amount of computing within the painter station may also vary. Upon entering the painter station the incoming polygon command will be used to generate the next horizontal line command, as noted above. The command may be modified to reflect changes when the command is moved along the active polygon ring. Points, lines, triangles, rectangles, trapezoids and quadralaterals can be transformed into horizontal lines with slight modification of the computing hardware at the painter station, within the teachings of the invention. Similar to microprogrammed control of central processing units, this scheme allows painting of a wide range of geometrical figures with minor adjustments to the underlying hardware.

Figure 1:
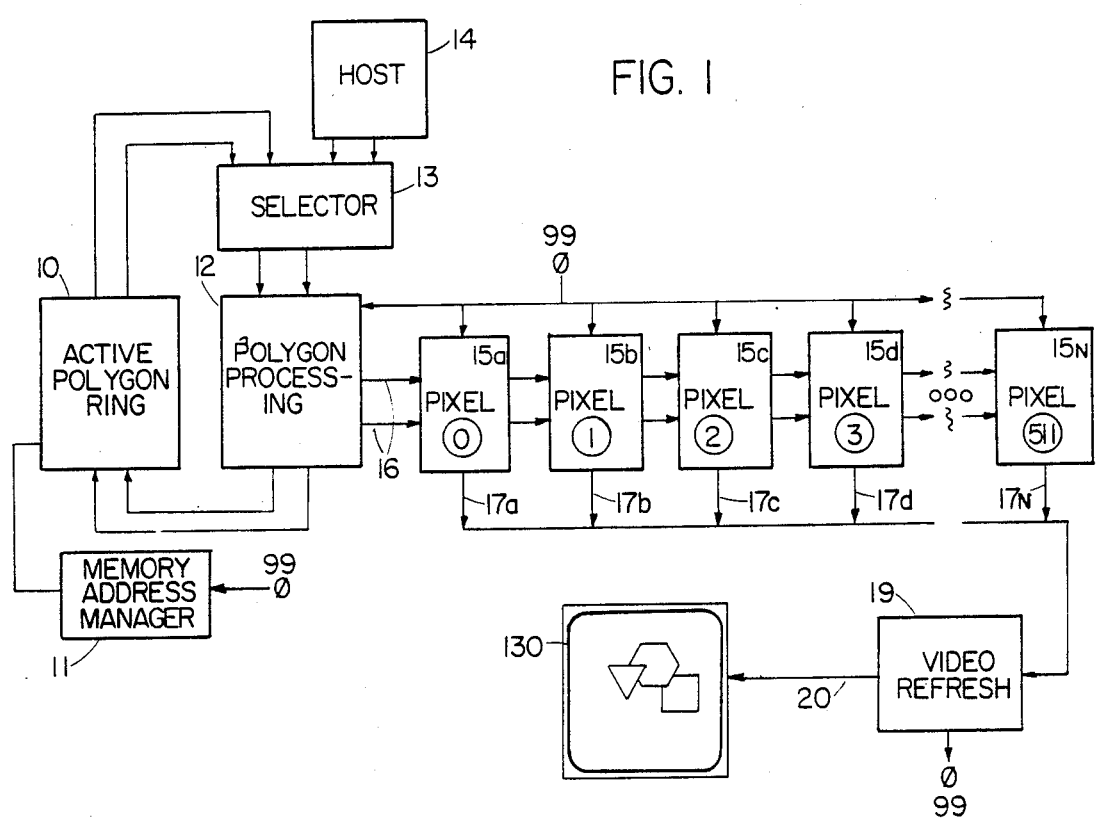
FIG. 1 shows a block diagram of the invention.

FIG. 1 shows a block diagram of the system as it might be built. The active polygon ring (10) may have a memory address manager (11) which can handle the actual circulation or data, or as noted above, can handle the pointers to the address of the next polygon instruction in a circular queue. The selector (13) may then be used to select the next instruction to be considered between those circulating in the ring and those generated by the host (14). The polygon processing block (12) implements the painters station in examining circulating polygon commands and generating commands for the line buffer. These commands (16) pass from stage to stage (15) along the line buffer from position 0 to position 511. The stages all have outputs (17) to the video bus (18) which is connected to a video refresh stage (19) which in turn generates an analog video output (20) to control the beam intensity to the display (130). The video refresh stage may also generate clock and line and pixel synchronization (99) outputs to synchronize the earlier stages to the raster display.

TABLE 1

Comparative systems for pixel processing in pipeline stages of line buffer

| # | Hidden Surface Removal | Color Shading | How Color Specified | Depth Computation | Color Computation |
|---|---|---|---|---|---|
| 1 | Time Priority | None | 1 Color Byte | None | None |
| 2 | Time Priority | None | R-G-B | None | None |
| 3 | Time Priority | R, G, B | R-G-B | None | 3 additions |
| 4 | Depth Priority | None | 1 Color Byte | 1 comparision 1 addition | None |
| 5 | Depth Priority | None | R-G-B | 1 comparision 1 addition | None |
| 6. | Depth Priority | R, G, B | R-G-B | 1 comparision 1 addition | 3 additions |

Table 1 shows the six variations on the hidden surface removal and color shading, which will influence the choice and complexity of the pixel processors to be used in the stages of the line buffer pipeline. Table 1 is roughly arranged in order to complexity from least complex to most. For the purpose of this discussion of the preferred embodiment only the most and least complex will be discussed, with the other four variations being determined in obvious fashion from those two. In each of the two examples given it is assumed that the painters station is providing micropainter instructions which will be acted upon by the pipeline, in which the Xleft number has been decremented by one for purposes of ease of use. The purpose of this will become obvious in this discussion. If Xleft should equal 0 the active byte will initially be one when the micropainter is set into the pipeline, otherwise the active byte will be initially 0. This "predecrement" system is chosen since it makes it possible for each pixel processor to merely check for equality of address, rather than having to check for a less than or greater than situation, which one skilled in the art will recognize as more complex.

Figure 3:
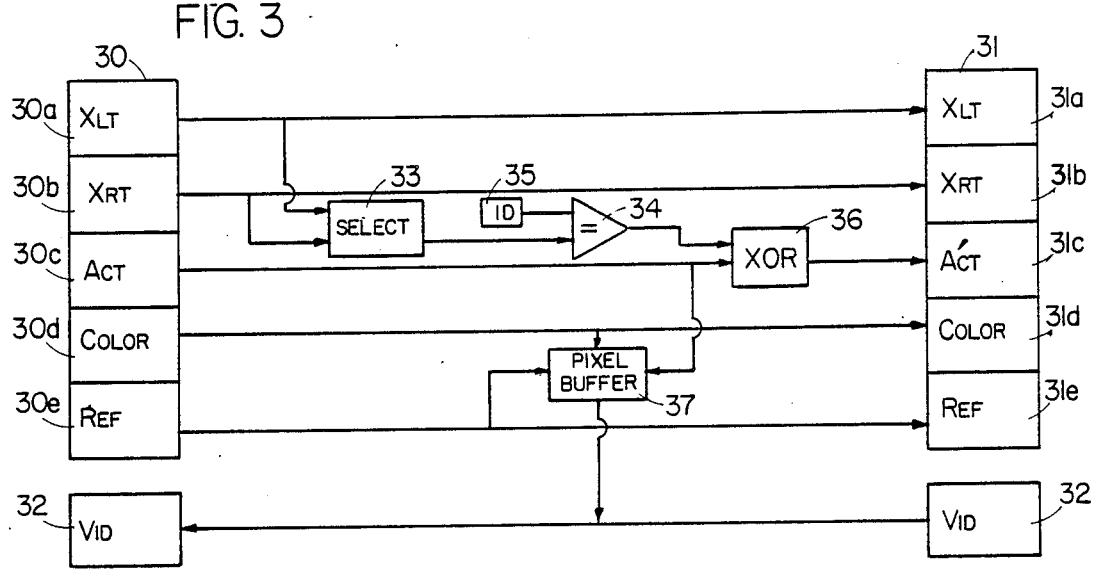
FIG. 3 shows a design for a representative line buffer pixel processor stage as used in the preferred embodiment of the invention, in a simple form.

FIG. 3 shows a block diagram for a pixel processor in the simplest case. The micropainters will be supplied in time priority order, thus no hidden surface checking need be done at the pixel processor level. The color is a constant (i.e., no shading across the polygon), therefore no color processing need be done. The processor receives the micropainter in the input register (30a–30e) and after processing passes the micropainter along to the output register (31a–31e) where it is input to the next stage. Passing of the information along is controlled by the clock, in a method which will be obvious to one skilled in the art, and is not shown here for simplicity. The only modification which will be made to the micropainter in the processor is to the active bit (30c/31c). When the micropainter is received in the input register the processor will examine the active bit (30c) in the selector (33). The selector will choose exist Xleft (30a) if the active bit is off, or Xright (30b) if the active bit is on. This selected address is used as one input to a comparator (34) and compared against the identification number of the particular location of the processor (35). This address will correspond to its position in the pipe line. For example, the i.d. of the first pixel processor might be 0 which would then be incremented down the pipeline until the address of the last processor is perhaps 511. If the address comparison succeeds, that is the address being compared is equal to the identification of this processor, the active bit is inverted (if active is 1 then it is made 0 or if active 0 then it is made 1). Thus, the active bit is turned on, then off, as it passes through the zone in which that particular micropainter should be active. The new active bit is loaded into the output register (31c). At the same time the active bit acts as an input to cause a load in the pixel buffer (37). If the active bit is active (i.e. active equals 1) then the color (30d/30d) is copied into the pixel buffer. Finally, if the refresh bit (30e/31e) is active the pixel buffer is loaded onto the video bus (32). The refresh bit would be active only in cases of "microinspector" instructions. It is expected that the pixel processor of the design shown in FIG. 3 and FIG. 4 would, of course, be implemented in the form of a single building block on a large scale integrated circuit. The functions shown here as block diagrams are basic building blocks in integrated circuit design, and it is felt that no further detail would be necessary for any person skilled in the art to determine the design of the individual building block elements within the processor as described.

Figure 4:
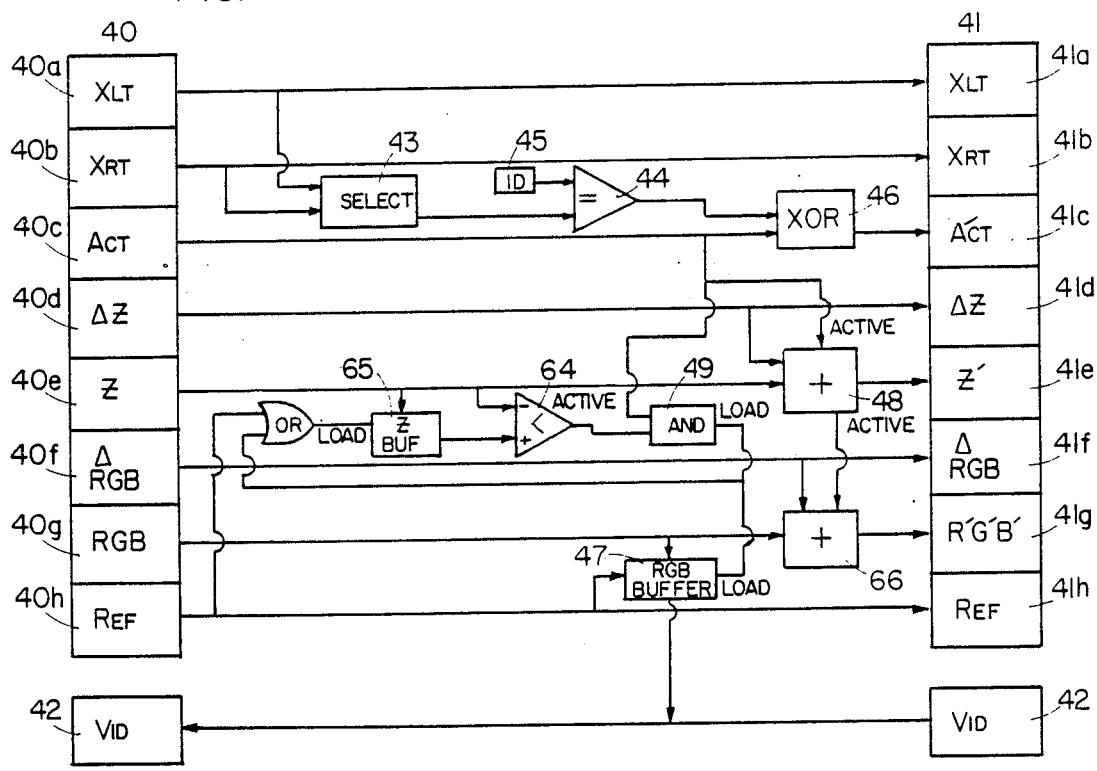
FIG. 4 is a more complex version of a representative pixel processor stage.

FIG. 4 shows a pixel processor of the most complex situation shown in Table 1, that in which depth priority hidden surface removal is used, and color shading is provided. In this situation the micropainter instructions generated by the painters station would contain information as to the depth (Z) of the beginning of line (Xleft) and a slope of the line (delta Z) and would also provide a starting color in terms of red, green and blue values or intensities (R-G-B) and a change in color along the line (Delta R-G-B). Each pixel processor would then have to not only check and alter the active bit, as in case one, but would also have to perform the calculations on the depth and color. Additionally the status of the depth of this painter and of last depth loaded becomes relevant. This can been seen in the design shown as FIG. 4. Once again, as in FIG. 3, the pixel processor will pass the micropainters from an input register (40a–40h) to an output register (41a–41h), based on the clock which is once again not shown for simplicity sake. As can been seen in FIG. 4 the processing of the active bit (40c) to (41c) is identical to that in the simplest case, as discussed earlier and shown in FIG. 3. The active bit (40c) is used to select Xleft (40a) or Xright (40b) in the selector (43) and the selected address is compared (44) to the processor identification (45) and if equal the active bit is inverted (46). The additional complexity of this circuit becomes obvious below that point on the figure. The following discussed processing will take place in parallel with that based on address as discussed above, if the incoming active bit (40c) is indeed active (active equals 1). The color (RGB) (40g) will be loaded into the video buffer (47) only if the point is not hidden by a higher already painted point. This is done through a comparison of the depth value (Z) (40e) with a value in a Z buffer (65) in which is stored the highest previously encountered value for depth. The value of the Z buffer is compared in a comparator (64) and if the Z buffer is less than the incoming value for Z, and the active bit is on, a logic and gate (49) will both load the value for Z into the Z buffer (65) and will also load the color (40g) into the video buffer (47). The values for Z and color are incremented if the active bit is set. Adder (48) adds the increment delta Z (40d) to the incoming depth (40e) and loads it into the output (41e). Similarly, another adder (66) adds the color increment delta RGB (40f) to the color value (40g) to come out with an output color value (41g). For simplicity this is discussed as if it were one value comprising the three individual color values. It will be recognized that this may actually be accomplished by tripling the address, buffers, etc., or by providing three parallel pipelines, one each for red, green and blue. Once again as in FIG. 3, if a microinspector instruction is present with a refresh bit (40h) active then the value in the video buffer (47) is copied to the video bus. Once again it will be recognized that the video buffer is, in fact, three buffers, one for each of the red, green and blue values.

Because of the parallel processing of the address, depth, and color the processor design shown in FIG. 4 can perform all of these operations in the single clock cycle allowed so that the processing will remain in synchronization with the video refresh. It will be understood, of course, that many other designs for pixel processors other than the ones shown here will be possible within the teachings of the invention, but these two are offered as examples varying in degrees of complexity which could be used in the system of the invention. It will be recognized, for example, that the active bit is not necessary, but the pixel processors could perform the two compares (Xleft<=ID<=Xright) necessary to perform the active load, although the use of an active bit is preferred for a reduction in processor complexity and an advantage in speed.

It will also be seen (FIG. 9) that, should speed problems arise, that pairs of pixel processors could be established in odd-even pairs, with one processor (91) inspecting a given micropainter (93) from the point of view of an odd pixel, and its mate (92) from the next (even) pixel. With each element of the pair operating on the same instruction in parallel, the instruction traveling rate is effectively doubled. Each instruction is output (96) in turn to the next pair. Each processor writes its video output (97) to the video bus (95) in turn, similar to the single processor situation, or a second video bus (95a) added, with a selector at the video refresh means.

Figure 8:
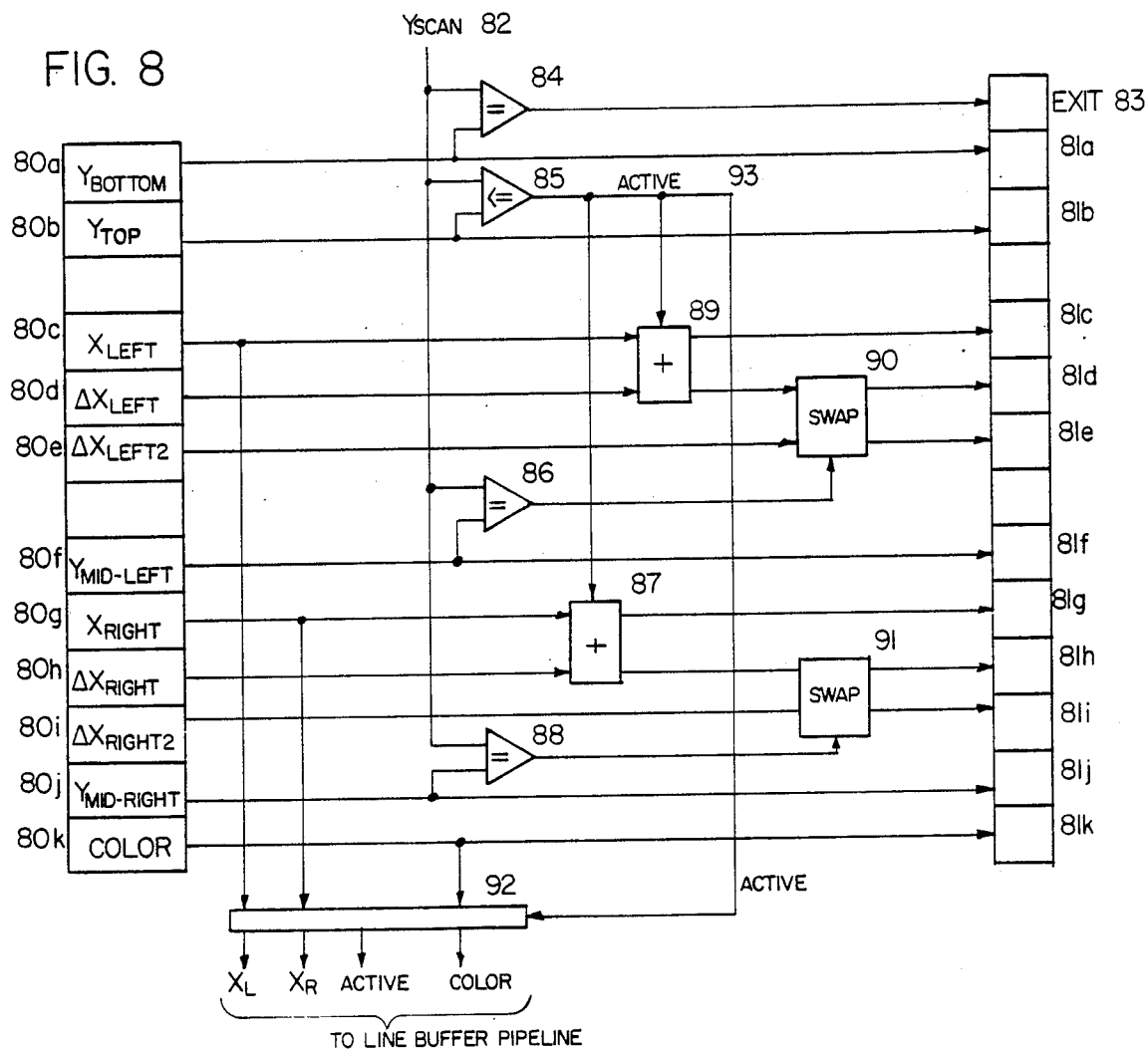
FIG. 8 shows a design for a painter's station or polygon processor.

FIG. 8 shows a partial design for a polygon processor (painters station). Polygon commands enter at input register 80a–80k and are passed back into the polygon ring at output register 81a–81k. The current scan line is kept as Yscan (82). This is compared in a comparator (84) and an exit signal is generated if the Ybottom is equal to Yscan, that is, that if the bottom of the polygon has been reached. This exit signal may be used in any number of ways either to route the polygon command elsewhere than in the ring, or to inhibit the copying of the polygon command into the ring, depending on the design scheme chosen for the polygon ring from among the many known to the art. Yscan is also compared with Ytop (80b) in comparator (85). If Yscan is less than or equal to Ytop, that is, if the line currently being generated is within the polygon referenced by the command, then the active bit (93) is activated signalling that the polygon processor should generate a line buffer command, and that other processing might need to be done.

For the purposes of this illustration it is assumed that the polygons do not have any shading in color and that they may have, at most, one change in slope of left boundary and one change in slope of the right boundary. That is to say that a polygon processor designed as shown here would handle polygons up to the complexity of a diamond figure. It will be obvious that the polygon processor may be further complicated with the addition of additional components for color shading and depth priority if desired, but these have been left out for simplicity of explanation.

The left margin of the line Xleft (80c) is incremented by delta Xleft (80d) in adder (89) and passed out as (81c) if the line is active. Similarly, the right margin Xright (80g) is incremented by delta Xright (80h) in adder (87) and written out as (81g). The current line is compared to two break points Ymidleft (80f) and Ymidright (80j) in comparators (86) and (88). If either of these is equal then the two values of delta Xleft (80d)(80e) or delta Xright (80h)(80i) are swapped in (90) or (91) and written out as the corresponding (81d) or (81e). The active bit (93) also acts to cause Xleft (possibly decremented as discussed earlier) and Xright (80g) and the color (80k) to be written as micropainters to the line buffer pipeline.

As has been indicated earlier, after all of the active polygons have been processed by the polygon processor or painter's station, the line buffer pipeline must be filled with null commands, such that there is always the same number of commands in the pipeline as there are pixel processors. This may be accomplished with the processor as shown in FIG. 8 by arranging the polygon ring to have the same number of storage elements as the pipeline has pixels. The empty elements will then generate null micropainters (or repeat the last micropainter) as they circulate through the polygon processor. Alternatively, the processor itself may be desired to count pixels and generate the nulls.

The overall system of the invention is capable of painting 512 active polygons per line, which is equivalent to about 5000 polygons per frame, or about 150,000 polygons per second. It is quite unlikely that one would want to paint such complex images with 5000 or more polygons. The host would have difficulty generating 150,000 polygon commands every second. One line buffer can thus paint more polygon commands than the host can generate. However, there is no reason that the invention should be limited to a single line system. A sequence of line buffers, (FIG. 10) where a polygon command (101) leaving the painter station (102) will enter the (i+1)st station, (103) can be used to speed up the image generation rate beyond typical requirements. In such a case the polygon processing section FIG. 1 (12) and line buffer stages FIG. 1 (15) would be duplicated for a plurality of lines, (104) (105) and each line would write to the video bus (106) in turn. This would allow additional time for processing while the screen is refreshed.

Figure 12:
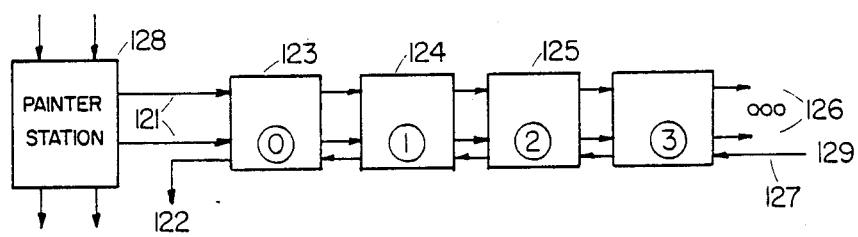
FIG. 12 shows an embodiment with local refresh of video.

The preceding discussion and figures have used a "global" video refreshment method, using a single, command, video bus. FIG. 12 shows an alternative, or "local" refresh method would could be used. To the data pipeline (121), flowing from the polygon processors (123) through the pixel processors (123), (124), (125), and on (126), is added a video pipeline (127) flowing from higher numbered processors (129) downward to lower (125), (124) until it reaches the processor for pixel 0, (123) and is passed to the video refresh (122), where it acts just like a video bus. The video information is copied from input registers to output registers, exactly as previously discussed for the micropainters and in step with them, the sole difference being the direction in which the copying is done.

Several versions of the system have been successfully simulated. It is reasonable to believe that simple versions of the line buffer can be integrated with less than 100,000 transistors on a single VLSI chip. Or complex versions could be distributed on several chips. In any case the complete system can be easily integrated on a single printed circuit board.

Accordingly, it is to be understood that the embodiments of the invention herein described are merely illustrative of the application of the principles of the invention. Reference herein to the details of the illustrated embodiments is not intended to limit the scope of the claims which themselves recite those features regarded as essential to the invention.

I claim:

1. A real-time image processing system for creating color video images on a raster-scan display made up of a plurality of scan lines, each scan line made up of a plurality of picture elements ("pixels"), the image comprising a plurality of polygons, the polygons being based upon a plurality of data elements supplied from a host computer, each data element representing a single polygon to be displayed, the data element specifying at least beginning and ending scan lines, beginning and ending pixel locations on at least one line, and color for each polygon, comprising:

(a) circulating ring means for storing and sequentially accessing a plurality of data elements, comprising:
        (1) storage means for storing a plurality of data elements in discrete locations;
        (2) input means for accepting data elements for the host computer and placing them in locations in the storage means;
        (3) memory management means for organizing the storage means, whereby each data element stored in the storage means may be individually accessed as if in a circular queue, whereby the storage means is organized by the memory management means as a first-in-first-out memory in which the first data element in the storage means is sequentially accessed immediately after the last data element;
        (4) polygon processing for decomposing the polygon represented by the data elements accessed by the memory management means into scan lines;
    (b) video refresh means for creating the video image on the raster-scan display, comprising:
        (1) input means for accepting pixel data;
        (2) video output means for generating video displays from the pixel data supplied by the input means;
        (3) synchronization means for indicating the scan line and pixel being generated, having a clock input for synchronization pulses, and current pixel and line indication output means for indicating the point in the image being currently written to the raster-scan display;
    (c) the polygon processing means comprising:
        (1) input register means for accepting a data element representing a polygon from the storage means via the memory management means;
        (2) selection means for examining the data element in the input register means and determining if at least part of the polygon represented by the element is located on the scan line currently being created, having a data input connected to the input register means, a synchronization input connected to the screen synchronization means of the video refresh means, and an active output indicating that at least part of the data element is located on the current scan line;
        (3) painter station means for creating line buffer instructions, having a first input connected to the input register means, a second input connected to the active output of the selection means, a third input connected to the synchronization means of the video refresh means and output means adapted to producing micropainter, null, or microinspector instructions for loading into a line buffer pipeline;
        (4) output register means for replacing a data element into the storage means via the memory management means;
        (5) processing means for transferring data elements from the input register means to the output register means;
        (6) the painter station being adapted to produce micropainter instructions at the output means if the active output of the selection means indicates that the data element in the input register means is active; the micropainter comprising at least the addresses of the leftmost and rightmost pixels on the current line on which the polygon represented by the data element appears, and the color of the polygon;
        (7) the painter station being adapted to produce null instructions at the output means if the active output of the selection means is not active, the null instructions being instructions which do not have any active pixels or are identical to the last micropainter instruction produced by the painter station, whereby no change in the scan line is caused by the instruction;
        (8) the painter station being adapted to produce microinspector instructions at the output means if the synchronization means of the video refresh means indicates a new line is to be displayed, the microinspector comprising at least a refresh flag;

(d) line buffer pipeline means comprising:
   (1) a plurality of pixel processors, one for each pixel on a scan line, comprising:
      (a) input register means for accepting an instruction, comprising storage for at least a beginning address and an ending address, a color, and a fresh flag;
      (b) output register means for transmitting an instruction, comprising storage for at least a beginning address and an ending address, a color and a refresh flag;
      (c) pixel buffer means for storing the color of a pixel, having a color input connected to the color storage of the input register means, a load input, a read input connected to the refresh flag storage of the input register means, and a video output;
      (d) processing means for copying the instruction in the input register means into the output register means, comprising a clock input, a data input connected to the input register, and a data output connected to the output register, whereby a signal at the clock input causes the data in the input register to be copied to the output register;
      (e) identifier means for indicating which pixel in the scan line is processed by the pixel processor;
      (f) comparator means for determining if the instruction in the input register affects the pixel processor by the pixel processor, having inputs connected at least to the beginning and ending addresses in the input register means, and an active output adapted to indicate active if the pixel is addressed by the instruction, the active output being connected at least to the load input of the pixel buffer means;
      (g) the pixel buffer means being adapted to storing the color from the color input when the load input is active; whereby the color from the input register is stored if the instruction affects the pixel processed;
      (h) the pixel buffer means being adapted to output the color stored to the video output of the pixel buffer means when the read input is active, whereby the stored color output upon receipt of a microinspector instruction;
   (2) video reading means for conveying video information to the video refresh means, having a plurality of inputs connected to the video outputs of the pixel buffer means, and an output connected to the input means of the video refresh means;
   (3) the input register means of the first pixel processor being connected to the output means of the painter station means;
   (4) the input register means of each pixel processor except the first being connected to the output register means of the preceding pixel processor in the pipeline means;
   (e) clock means for generating clock signals on the pipeline for synchronization to the video refresh means, having an output connected at least to the clock input of the processing means of the pixel processors, and to the clock input of the synchronization means of the video refresh means whereby the instructions in the pipeline advance along the the pipeline from pixel processor to pixel processor, one step for each clock signal; the clock signals being synchronized such that the time for an instruction to pass through all the pixel processors on the pipeline is exactly equal to the time for one scan line to be generated in the video display.

2. The image processing system of claim 1 in which the video image represents polygons at a plurality of depths relative to each other, such that higher polygons may wholly or partly cover open lower polygons, and the data elements supplied by the host computer are adapted to being coded by the host computer with code means for specifying the depth of at least one pixel location in the polygon, and the micropainter instructions further comprise information for determining the depth of at least one point on the scan line.

3. The image processing system of claim 2 in which the pixel processors of the line buffer pipeline means further comprise:
   a. the input register means further comprising a depth code for indicating the depth of the polygon at that pixel;
   b. the output register further comprising a depth code for indicating the depth of the polygon at the next pixel;
   c. Z buffer means for storing the depth of the last micropainter which caused its color to be stored in the pixel buffer means;
   d. depth comparator means for comparing the depth of the micropainter being processed by the pixel processer to the depth stored in the Z buffer, having a first input connected to the depth code of the input register, a second input connected to the Z buffer, and a load output adapted to indicate active if the micropainter specifies a depth which is higher than the depth stored in the Z buffer;
   e. the pixel buffer means further comprising a depth load input connected to the load output of the depth comparator means;
   f. the pixel buffer means being further adapted to storing the color from the color input only when both the load input and depth load input are active.

4. The image processing system of claim 3 in which:
   (a) the micropainter instruction further comprise increment information for indicating the change in depth of the polygon along the line;
   b. the processing means for transferring data elements of the pixel processing means of the line buffer pipeline further comprising means for adding the increment to the depth code of the input register means before copying it to the output register means, whereby the depth of the polygon may slope from one end of the line to the other.

5. The image processing system of claim 1 in which the video image represents polygons in a plurality of depths relative to each other, such that higher polygons may wholly or partly cover lower polygons, and data elements supplied by the host computer are coded by the host computer with code means for specifying the time the polygon is to be written, whereby polygons to be written later in time may write over polygons to be written earlier in time.

6. The image processing system of claim 1, in which the video image represents polygons which may be shaded in color across the polygon, in which:

(a) the data elements supplied from the host computer further comprise a first color increment code means for specifying the change in color per line from the top of the polygon to the bottom, and a second increment code means for specifying the change in color of the polygon from left to right;

(b) the processing means of the polygon processing means further comprising adder means for incrementing the color in the polygon instruction by the first color increment means before transferring the data elements from input register means to the output register means;

(c) the micropainter instructions further comprising a color increment code;

(d) the processing means of the pixel processors of the line buffer means further comprising adder means for adding the increment code of the micropainter to the color before copying the micropainter instruction in the input register means to the output register means, whereby the color of the polygon is made to change across the line being written.

7. The image processing system of claim 1 in which there are a plurality of line buffer pipeline means, adapted to processing more than one line in parallel, and in which the polygon processing means comprises a plurality of painter station means, one for each line buffer means.

8. The image processing system of claim 1 in which the number of pixel processors is an intergral fraction of the number of pixels on the screen line, and in which the pixel processors further comprise:

(a) the output register means of the last pixel processor being connected to the input register means of the first pixel processor whereby instructions in the line buffer pipeline may circulate from the last pixel processor back to the first one;

(b) the identifier means of the pixel processors further comprising means for changing a pixel which the pixel processor is processing, whereby each pixel processor may be caused to process a plurality of pixel information;

(c) the identifier means further comprising means for changing the identification of the pixel being processed when the microinspector instruction is received.

9. The image processing system of claim 1 in which the pixel processors of the line buffer pipeline means are connected in pairs, the input register means of each pair of pixel processors being connected in parallel, each pair comprising the pixel processor for a odd numbered pixel and the adjoining even numbered pixel, whereby each pair of pixel processors may work on the micropainter instructions in parallel.

10. The image processing system of claim 1 in which the video reading means of the line buffer pipeline means comprises a global bus connected to all of the pixel processing means in parallel having an output connected to the video refresh means input means.

11. The image processing system of claim 1 in which the video reading means comprises:

(a) video input register means in each of the plurality of pixel processors;

(b) video output register means in each of the plurality of pixel processors;

(c) processing means for copying the instruction in the video input register means into the video output register means, comprising a data input connected to the video input register means and a data output connected to the video output register means, whereby a signal of the clock input causes the data in the input video register to be copied into the output video register;

(d) the clock input of the video processors means being connected to the output of the clock means, whereby the video information is passed from the input register means to the output video means in synchronization with the instructions being copied from the input register means into the output register means by the processing means of the pixel processor;

(e) the input register means of each pixel processor means except the last being connected to the output video register means of the next higher numbered pixel processor;

(f) the video output register means of the lowest numbered pixel processor being connected to the input means of the video refresh means.

12. The image processing system of claim 1 in which the input means of the circulating ring means comprises:

(a) first-in-first-out buffer means for accepting and storing data elements from the host computer, having an input for new data elements connected to the host computer, and an output for outputting the oldest data elements in the buffer means;

(b) selector means for placing data elements in locations in the storage means, comprising an input connected to the output of the first-in-first-out buffer means, and an output adapted to placing data elements in selected positions in the storage means.

13. The image processing system of claim 12 in which the selector means of the input means of the circulating ring means further comprises comparison means for comparing at least the beginning scan lines of the output data elements from the first-in-first-out buffer means with a data element in the circular queue in the storage means, whereby data elements from the host may be inserted into the circular queue in order at least of beginning scan lines.

14. The image processing system of claim 13 in which the data elements are stamped by the host with an addition value representing the time or depth priority of the data element, and the comparison means compares based on both beginning scan line and the time or depth priority, whereby the data elements in the circular queue are sorted in order of beginning scan line and depth.

* * * * *